United States Patent [19]

Cicinnati et al.

[11] Patent Number: 5,044,609

[45] Date of Patent: Sep. 3, 1991

[54] GUARDRAIL BARRIER

[75] Inventors: Luigi Cicinnati, Padua; Adriano Fracasso, Fiesso D'Artico, both of Italy

[73] Assignee: Metalmiccanica Fracasso S.p.A., Fiesso D'Artico, Italy

[21] Appl. No.: 469,070

[22] Filed: Jan. 23, 1990

[30] Foreign Application Priority Data

Feb. 24, 1989 [IT] Italy .................. 12432 A/89

[51] Int. Cl.$^5$ ............................................. E01F 15/00
[52] U.S. Cl. ..................................... 256/13.1; 256/19
[58] Field of Search ...................... 256/13.1, 19, 65, 67; 248/66; 403/2; 285/1-4; 404/10; 52/98

[56] References Cited

U.S. PATENT DOCUMENTS

| 3,284,054 | 11/1966 | St. Pierre | 256/13.1 |
| 3,332,666 | 7/1967 | Gray | 256/13.1 |
| 3,417,965 | 12/1968 | Gray | 256/13.1 X |
| 3,912,404 | 10/1975 | Katt | 403/2 |
| 4,252,464 | 2/1981 | Habib | 403/2 X |
| 4,330,106 | 5/1982 | Chisholm | 256/19 X |
| 4,610,432 | 9/1986 | Lewis et al. | 403/2 X |
| 4,655,434 | 4/1987 | Bronstad | 256/13.1 |
| 4,838,523 | 6/1989 | Humble et al. | 403/2 X |

FOREIGN PATENT DOCUMENTS

| 0356686 | 3/1990 | European Pat. Off. | |
| 1295582 | 5/1969 | Fed. Rep. of Germany | |
| 2642475 | 4/1977 | Fed. Rep. of Germany | |
| 1584411 | 12/1969 | France | |
| 1050799 | 12/1966 | United Kingdom | 256/13.1 |
| 1229795 | 4/1971 | United Kingdom | 248/66 |

Primary Examiner—Randolph A. Reese
Assistant Examiner—Franco S. De Liguori
Attorney, Agent, or Firm—Larson & Taylor

[57] ABSTRACT

A metallic guardrail barrier comprises a sustaining post, a spacing member extending parallel to the ground, secured at one side to the sustaining post and carrying at the other side a supporting member to which the rail is secured. The rail supporting member is mounted on the spacing element so as to be swingable about a fulcrum parallel to the longitudinal direction of the rail and located at a level not coinciding with the level of the centerline of the rail. Shock absorbing mechanisms are provided to dampen the swinging movement of the supporting member around the fulcrum, following the impact of a vehicle against the rail, in a manner which is proportional to the intensity of the impact. The shock absorbing mechanisms comprise a pin or other suitable connecting or coupling element which connects the supporting member to the spacing element at a certain distance from the fulcrum and which is adapted to tear or rupture an area weakened by holes which are located on the supporting member and/or spacing element.

9 Claims, 6 Drawing Sheets

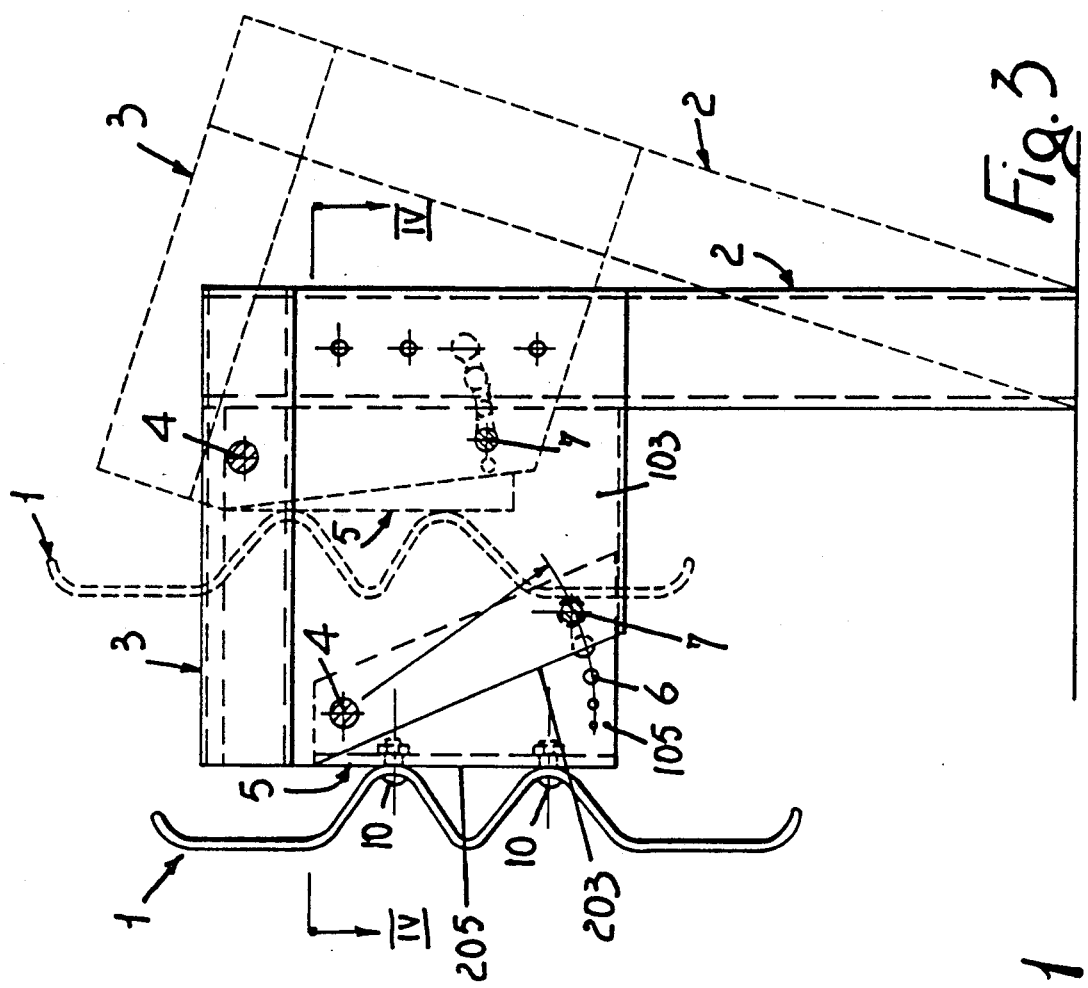
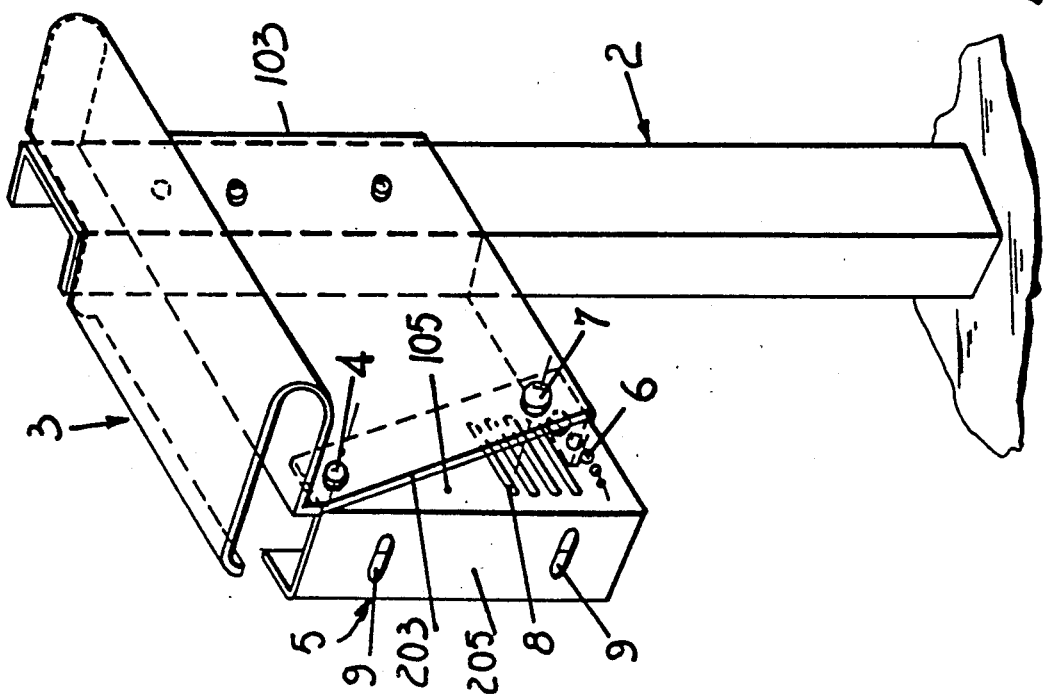

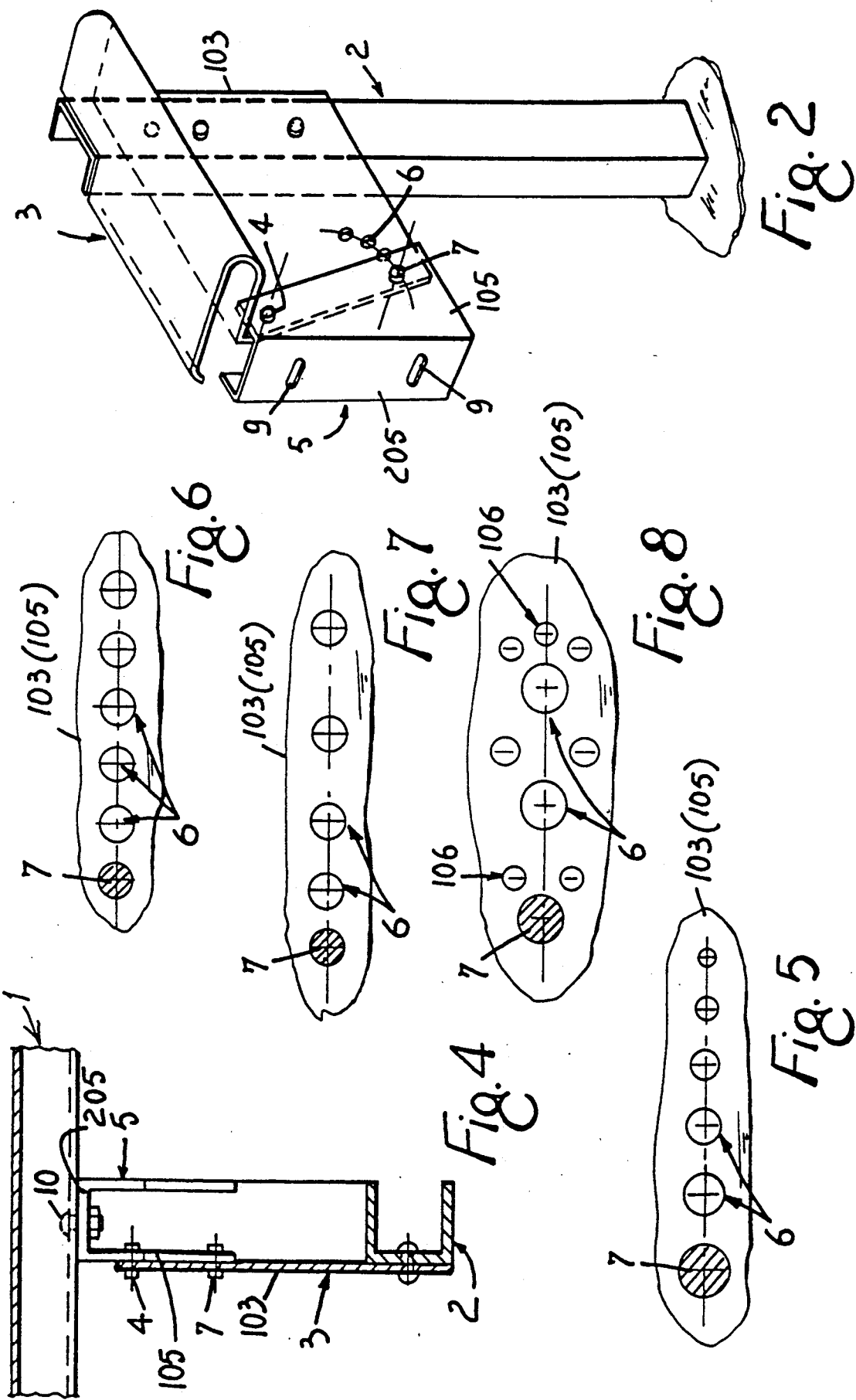

GUARDRAIL BARRIER

SUMMARY OF THE INVENTION

The invention relates to metallic guardrail barriers. In case of a crash, the barriers of known type are distorted in a manner that cannot be foreseen and the ribbon or rail thereof will be often bent transversely with outward rotation of its upper portion, thus forming an inclined plane that can be easily passed over by the vehicle that has struck the barrier.

More particularly, the invention relates, in a guardrail barrier, to a device that can be used for securing the rail of the barrier to the respective posts so as to absorb and dissipate energy in case of a crash and so as to maintain the rail in its original orientation whereby it can continue to perform its function properly.

According to the invention, there is provided a metallic guardrail barrier of the type comprising a sustaining post, a spacing member extending parallel to the ground, secured at one side to the sustaining post and carrying at the other side a supporting member to which the rail is secured. The characterizing feature resides in the fact that the rail supporting member is mounted on the spacing element so as to be swingable about a fulcrum parallel to the longitudinal direction of the rail and located at a level not coinciding with the level of the centerline of the rail. Suitable, shock absorbing means are provided to dampen the swinging movement of the supporting member around the fulcrum, following the impact of a vehicle against the rail, in a manner which is proportional to the intensity of the impact.

Preferably, the shock absorbing means comprise a pin or other suitable connecting or coupling element which connects the supporting member to the spacing element at a certain distance from the fulcrum and which is adapted to tear or rupture an area weakened by holes and/or other means and which is located on the supporting member and/or spacing element.

BRIEF DESCRIPTION OF THE DRAWINGS

The characterizing features of the invention and the advantages resulting therefrom will be apparent from the following description of some preferred embodiments thereof, shown by way of non-limiting examples in the figures of the accompanying drawings, in which:

FIGS. 1 and 2 are diagrammatic perspective views of two possible embodiments of the device according to the invention, shown in a rest condition and not provided with the steel rail;

FIG. 3 is a side elevational view of the road barrier provided with the device of the invention and shown with full lines in the rest condition and with dotted lines in the distorted condition after a crash;

FIG. 4 shows further details of the device according to the invention, on the line IV—IV of FIG. 3;

FIGS. 5, 6, 7 and 8 show, in a development on a plane, some possible embodiments of the weakened regions of the connection system of the energy-absorption and dissipation type applied to the device of the invention;

DESCRIPTION OF SOME PREFERRED EMBODIMENTS

Figure 9:
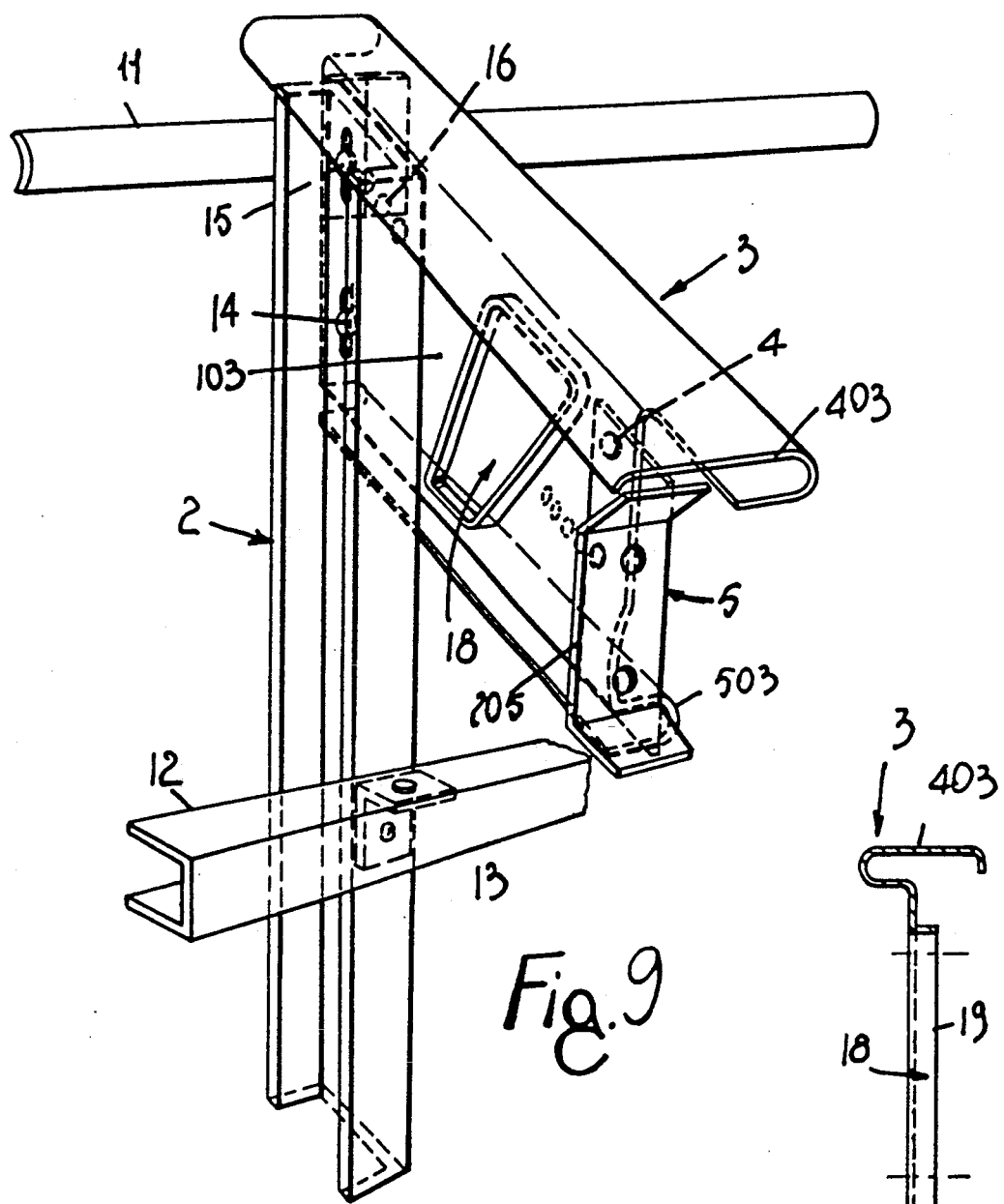
FIGS. 9 and 10 are a perspective and a side elevational view, respectively, of another embodiment of the device according to the invention.
Figure 12:
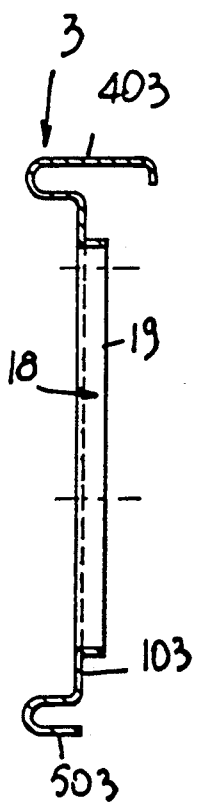
FIGS. 12 and 13 show the spacing member of FIG. 11 in a sectional view on the line XII—XII of FIG. 11 and in plan view, respectively.
Figure 13:
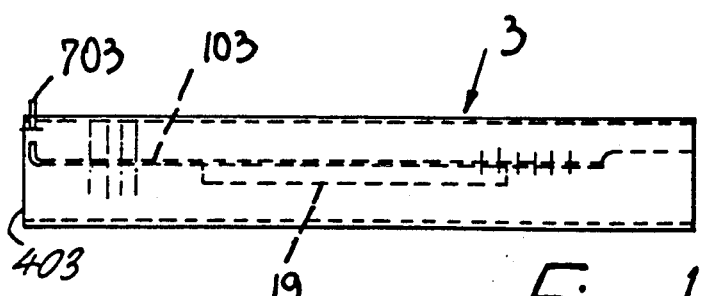
Figure 10:
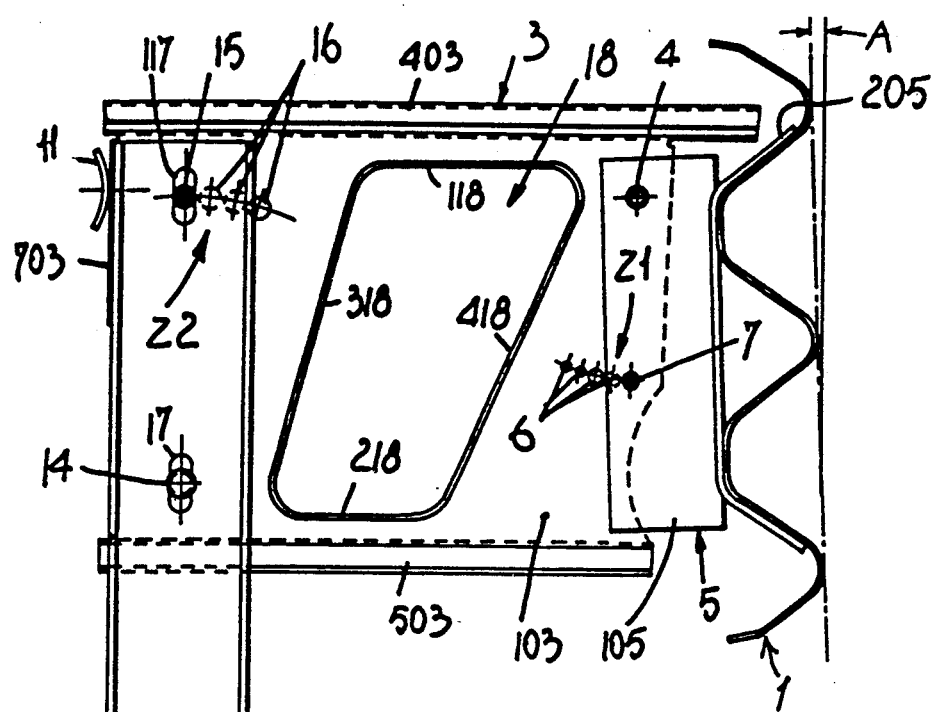
Figure 11:
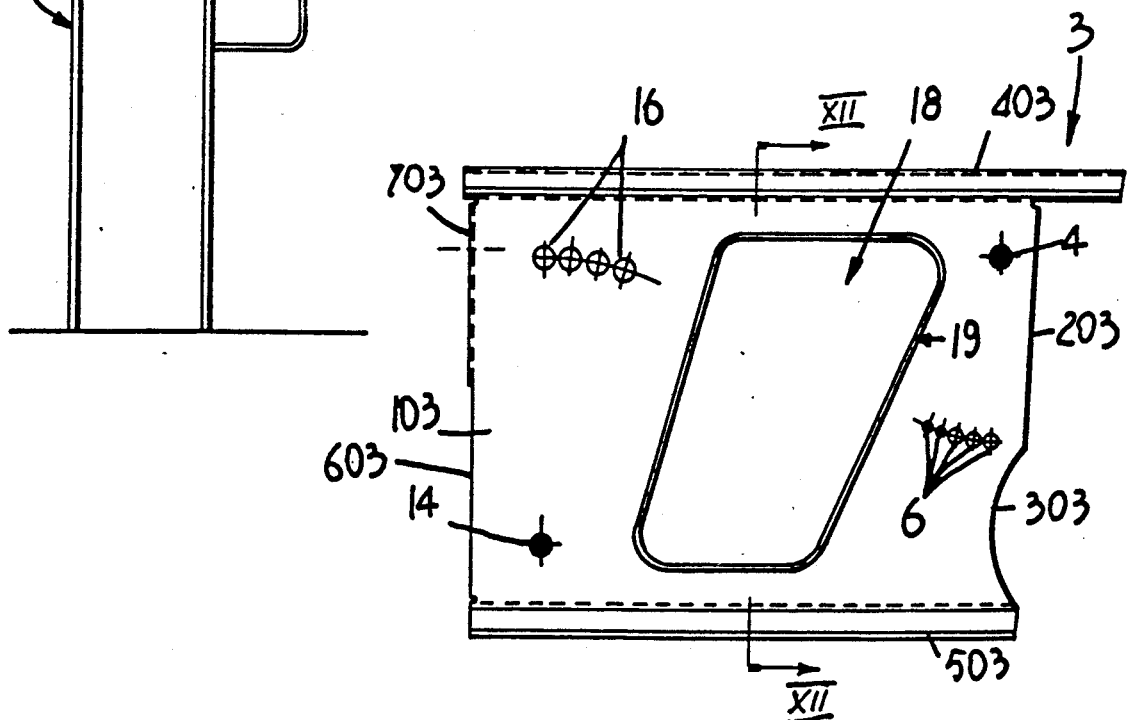
FIG. 11 is a side elevational view of the spacing member of the device shown in FIGS. 9 and 10.

In FIGS. 1, 3 and 4, the reference numeral 1 indicates the steel ribbon or rail of the road barrier which may also have a different profile. The numeral 2 indicates one of the posts which sustain the rail 1 in place, and the numeral 3 indicates a spacing element secured in cantilever fashion to the top portion of the post and supporting the rail 1 at the opposite end thereof. The spacing element 3 is made of metal and comprises at least one lateral flat wing 103 directed downwards vertically. The wing 103 has a lower side which is shorter than its upper side, so that a front side 203 is suitably inclined. At the top portion of the front side of the wing 103, there is pivoted at 4, for example by means of a bolt or rivet, the top portion of a flat side member 105 of a supporting member 5 made of metal plate of suitable thickness. The side member 105 has a downwardly diverging, e.g. trapezoidal, outline so that a portion thereof will be in contact over the entire height of the wing 103, and a portion thereof of progressively downwardly increasing width will protrude from the side 203 of said wing.

The lower portion of the side member 105 is connected to the wing 103 through a shock-absorbing, energy-recovering and dissipation system constructed as follows. In the lower portion of the side member 105 there is provided a weakened region having the outline of a circle sector with centerpoint at the fulcrum 4, said region being formed by a plurality of holes 6 of suitable diameter, either differentiated or constant (see below) and suitably spaced from one another. The end hole 6 that is located opposite the wing 103 is engaged by a bolt, a pin, a rivet or any other suitable connecting or coupling element 7 which is fixed to said wing 103. In FIG. 1, the numeral 8 indicates optional stiffening ribs for the side member 105.

The supporting member 5, has in plan view, for example, a U-shaped outline and is provided, in its front wall 205, with slots 9 to which the rail 1 of the barrier can be fixed by conventional fixing means 10. When the barrier is in its normal operative condition, the front side 205 of the supporting member 5 is in a vertical or substantially vertical position.

The above described device operates as follows.

When the rail 1 is struck by a motor-vehicle, the component acting perpendicularly against the rail subjects the barrier to the following distortion, with resulting energy absorption by the barrier. The sustaining post 2 tends to be bent outwards, with rotation about its anchorage region, as shown with dotted lines in FIG. 3. The rail 1 would tend consequently to become inclined transversely upwards as ocurring in the known art. By adopting the device of the present invention, a portion of the impact energy is absorbed by the supporting member 5, which rotates about the fulcrum 4 so that the coupling lower member 7 will break in a progressive, controlled and pre-established manner the diaphragms of the side member 105 which are located between the weakening holes 6. The barrier is thus constructed in such a manner that, proportionally to the bending of the post 2, the supporting member 5 will be rotated outwards to such an extent as to maintain the rail 1 substantially in the original position that is the most suitable to restrain the vehicle which caused the deformation (see the portions shown with dotted lines in FIG. 3).

Depending upon the energy-absorption requirements upon the crash, the holes 6 may have decreasing dimensions as shown in FIG. 5, or a constant dimension as shown in FIGS. 6, 7 and 8. The spacing between the holes 6 may be either constant as from FIGS. 5, 6, 8, or it may be different, i.e. increasing as in FIG. 7, or decreasing. In FIG. 8 there is shown a further modification, in which, in the spaces or diaphragms located between a hole 6 and the next one, there may be provided further weakening holes 106 in any suitable arrangement.

FIG. 2 shows a modified construction wherein the connecting or coupling element 7 is fixed to the side member 105, while the region which is weakened by the holes 6 is provided on the wing 103.

With particular reference to FIGS. 9 to 17, there will be now described another embodiment of the device according to the invention. The object of the modified embodiment is to amplify the dynamic reaction of the device, whereby it can operate with the maximum capacity of recovering and dissipating the kinetic energy of the colliding motor-vehicle and to react in such a manner that the guardrail will be raised to an extent which is directly proportional to the intensity of the collision, to match the different characteristics of the colliding motor-vehicle. This object is achieved by connecting the spacing member to the sustaining post so that it may be oscillated upwards and with the interposition of an energy shock-absorbing and dissipating system, similar to that which connects the supporting member for the barrier guardrail to the spacing member. Moreover, the spacing member is shaped so as to be bent upwards in case of a very strong crash, to cause a further raising of the barrier guardrail.

Referring firstly to FIGS. 9 to 13, reference numeral 1 indicates the guardrail of the road barrier, supported at its rear side by the suitably shaped wing portion 205 of a square angle support 5 which by the other flat wing 105 thereof is mounted beside one end of the flat body of the spacing member 3. The other end of spacing member 3 is fixed, as further explained below, to the top portion of the sustaining post 2 which is fixed to the ground. When the device is in its rest position, as in FIG. 10, the rail 1 is arranged transversely on a vertical plane or is inclined transversely with a setback of suitable amplitude upwards, so as to form an angle A of a few degrees with the imaginary vertical plane. As appearing in the detail views of FIGS. 11, 12 and 13, the upper and lower sides of the spacing member 3 are substantially of C-shape, as indicated at 403 and 503, respectively, so as to constitute stiffening ribs. The front side 203 of the spacing member is inclined backwards in the downward direction and is provided with a lower recess 303 for a purpose to be specified below. The rear side 603 of the spacing member is provided in the upper portion thereof with an integral squarely-bent wing 703 to which a C-shaped beam 11 may be secured. The beam 11 is arranged on the outer side of the sustaining post 2 and connects all the spacing members of the various supporting devices for the guardrail 1, so as to distribute to the adjoining devices the stresses imposed to each device upon the collision of a motor-vehicle against the guardrail 1. For the same reason, and also to avoid any dangerous interference of the forecarriage of a colliding vehicle with the sustaining posts 2, the sustaining posts are interconnected, at a suitable height above the ground, by means of a beam 12 which is secured in place by means of suitable brackets 13 or any other suitable means.

The sustaining post 2 has a U-shaped cross section, but it may be of any other suitable profile (see below).

Figure 14:
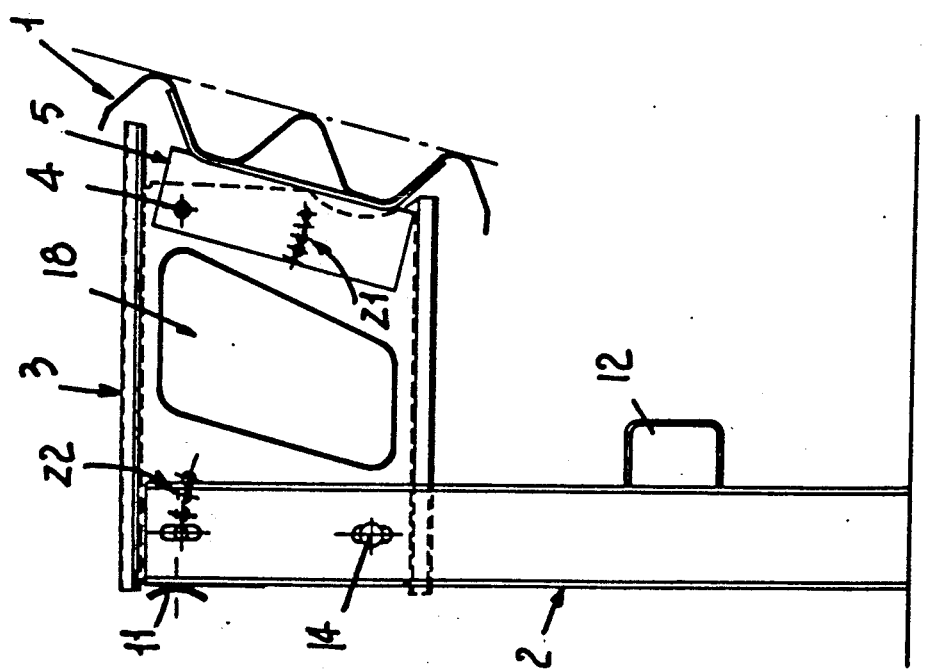
Figure 17:
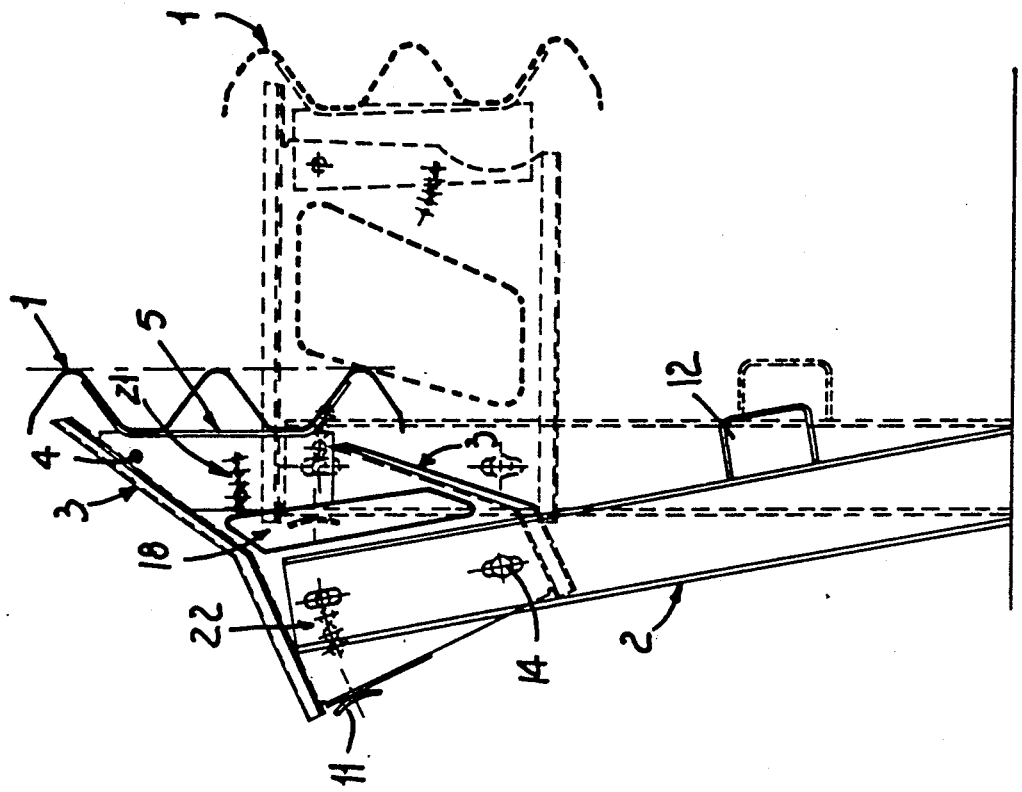
Figure 16:
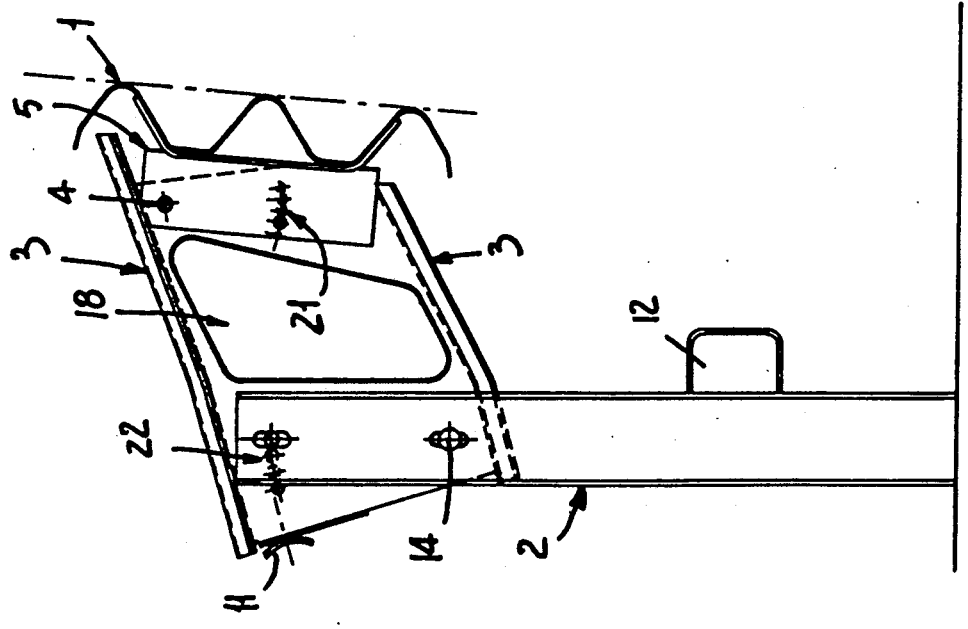

The wing 105 of the support 5 is connected to the body of the spacing member 3 by means of a shock-absorbing system Z1 in which the top portion of the wing 105 is pivoted to the body 103 by means of a pin 4 or any other means whereby the support 5 may be oscillated about an axis which is parallel to the longitudinal axis of the rail 1. The lower portion of the wing 105 is secured to said body 103 by means of a pin or any other suitable element 7 which, in case of a crash of a motor-vehicle against the rail 1, is oscillated outwards as shown in FIG. 14, thus tearing a corresponding area of the body 103 which has been weakened by holes 6.

Figure 15:
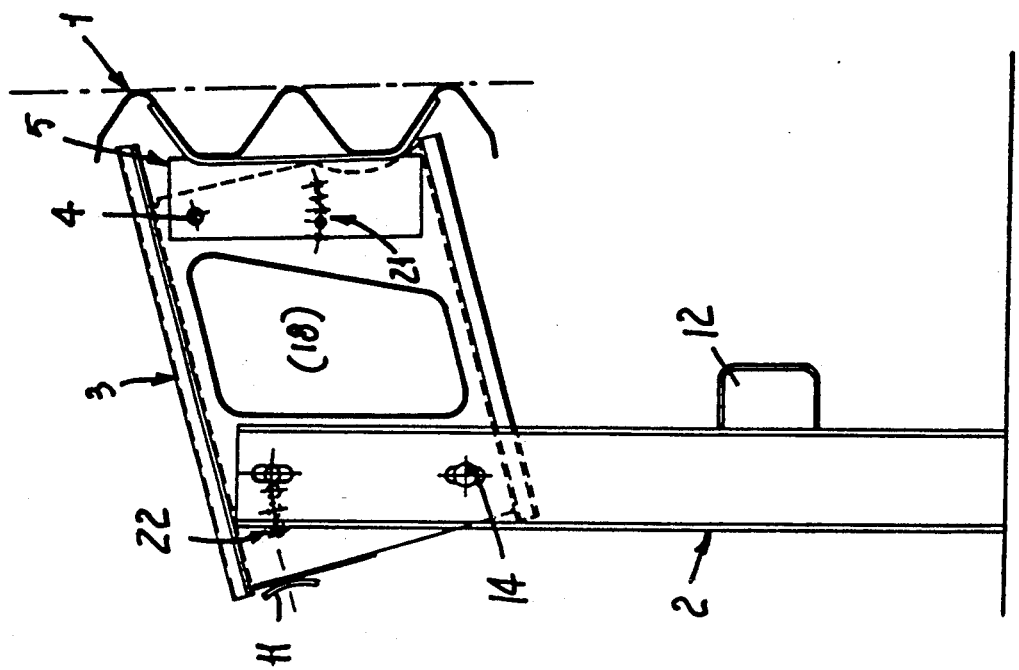
FIGS. 14, 15, 16 and 17 are side elevational views of the device of FIGS. 9 and 10 in some significant steps of the deformation sequence to which the device may be submitted.

The body 103 of the spacing member 3 is connected to the sustaining post 2 through a shock-absorbing system Z2 similar to the system Z1 which connects the support 5 to the spacing member, but the system Z2 is turned upside down so that in case of crash of considerable strength the spacing member will be oscillated upwards. The lower rear portion of the body 103 is pivoted to the sustaining post 2 by means of a pin 14 which is parallel to the pin 4, while the upper rear portion thereof is secured to the post by means of a further pin 15. In case of a crash of considerable intensity against the rail 1, pin 15 will tear an area of the body 103, weakened by holes 16, while the spacing member 3 is oscillated upwards. Since the post 2, generally, is installed in place at a prior time, it is provided with longitudinal slots 17 and 117 for receiving respective pins 14 and 15, so as to permit the post itself to match accurately the other portions constituting the device of the invention. The design characteristics of the shock-absorbing system Z2 may be such as to let it become operative either after or before the system Z1, or in combination therewith. FIG. 15 shows that when both shock-absorbing systems Z1, Z2 have carried out their functions, the rail 1 being suitably elevated with respect to the original position while maintaining, transversely, a substantial vertical position.

Still with reference to FIGS. 9 to 13, it is to be noted that the body 103 of the spacing member, in the region between the support 5 and the sustaining post 2, is provided with a polygonal window 18 framed by a stiffening rim 19, projecting towards the post. In the present case, the window 18 has a polygonal outline with two sides 118 and 218 which are parallel and adjacent to the ribbed upper and lower sides of the spacing member 3, while the other two sides 318 and 418 are inclined such as to form acute internal angles respectively of increasing amplitude upon incidence with the imaginary vertical plane passing through their lower vertex. The angle regions of the window 18 are suitably rounded. It is to be understood that the window 18 may be of any other shape provided that the shape is such as to ensure that when the rail 1 of the barrier is submitted to a considerably strong crash, and after the shock absorbing systems Z1-Z2 have performed their function, the spacing member 3 is deflected upwards by oscillating about virtual fulcrums. These virtual fulcrums are located, for example, near the ends of the rear side 318 of the window 18, as shown in the detail view of FIG. 16 and result in a further raising of the guardrail 1. If the crash is particularly strong, the sustaining post 2 is also bent outwards about a fulcrum in the region adjacent to the ground, while the spacing member 3 is flexed further upwards as shown in the detail view of FIG. 17. From this figure, it is apparent that in case of a very strong crash, such as caused by a trailer-truck, all the componets of the device will be distorted. Such distortion will result in recovering and dissipating energy, and will cause a considerable raising of the guardrail 1 with respect to the original position shown with dotted lines. The barrier has thus performed a self-adaptation for holding a motor-vehicle even though the latter has a center of gravity much above the ground. From FIG. 17 it appears as well that the presence of the beam 12 avoids any dangerous interference of a motor-vehicle against the posts 2.

We claim:

1. A metallic guardrail barrier comprising:
   a sustaining post projecting out from a ground;
   a spacing member extending parallel to the ground which is secured at one side thereof to said sustaining post;
   a supporting member secured at another side of said spacing member;
   an elongate rail mounted to said supporting member with a predetermined vertical orientation thereof;
   a member mounting means for mounting said supporting member to said spacing member and defining a fulcrum permitting said supporting member to swing about said fulcrum, said fulcrum being parallel to a longitudinal direction of said rail and located at a height above the ground to one side of the horizontal centerline of said rail; and
   a shock absorber means for damping a swinging movement of said supporting member about said fulcrum when a vehicle impacts said rail, said shock absorber means including (a) a weakened area of one of said supporting member and said spacing member at a location thereof spaced from said fulcrum, said weakened area being weakened by a plurality of holes provided therein, and (b) a pin connecting said supporting member and said spacing member and passing through one of said plurality of holes such that said pin causes a tearing of said weakened area when said rail is impacted by a vehicle and said supporting member swings about said fulcrum, wherein said supporting member includes a front to which said rail is secured and a side member having a downwardly diverging shape, said side member having an upper portion in which said fulcrum is located and a lower portion; wherein said spacing member includes a flat wing which is cantilever mounted to said sustaining post at one side and at another side is connected to said upper portion by said fulcrum and to said lower portion by said pin; and wherein said weakened portion has a curved outline having a centerpoint at said fulcrum and said holes are spaced from one another and arranged in a curved row along said weakened portion with said pin passing through one of said holes at an end of said row.

2. A guardrail barrier according to claim 1 and further including a second mounting means for mounting said spacing member to said sustaining post so as to be swingable about a second fulcrum; and a second shock absorber means for damping a swinging movement of said sustaining member about said second fulcrum when a vehicle impacts said rail, said second shock absorber means including (a) a second weakened area of one of said sustaining member and said spacing member at a location spaced from said second fulcrum, and (b) a second pin which connects said sustaining member and said spacing member and passes through said second weakened area such that said second pin causes a tearing of said second weakened area when said rail is impacted by a vehicle and said spacing member moves about said second fulcrum.

3. A guardrail barrier according to claim 2 wherein said spacing member is a substantially rectangular plate having upper and lower sides shaped to form stiffening ribs and a front side inclined downwardly and inwardly.

4. A guardrail barrier according to claim 3 wherein said front side of said plate includes a recess in a lower portion thereof.

5. A guardrail barrier according to claim 2 wherein said second weakened area is a portion of said spacing member in which second holes have been provided, and wherein said second pin is fixed in a top of said sustaining post and extends through one of said second holes.

6. A guardrail barrier according to claim 5 wherein said spacing member includes an upper slot and a lower slot; and wherein said spacing member is secured to said sustaining member by said second pin which extends through said upper slot and by a fulcrum pin which extends through said lower slot.

7. A guardrail barrier according to claim 1 wherein said spacing member includes an integral lug on a vertical outer side thereof which is outside of said sustaining post; and further including a beam attached to said lug which interconnects adjacent said sustaining posts.

8. A guardrail barrier according to claim 1 and further including an intermediate beam attached to an inner side of said sustaining post which interconnects adjacent said sustaining posts.

9. A guardrail barrier according to claim 1 wherein said spacing member includes a window therein formed by peripheral rim, said window including oblique sides and being shaped so as to collapse in an upwardly manner in response to a particularly energetic impact of the vehicle.

* * * * *